(12) United States Patent
Fader

(10) Patent No.: US 8,465,840 B2
(45) Date of Patent: Jun. 18, 2013

(54) POLYURETHANE SYSTEMS FOR PRODUCING POLYURETHANE SANDWICH PARTS AT LOW MOLDING TEMPERATURES

(75) Inventor: Michael Fader, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 294 days.

(21) Appl. No.: 12/921,514

(22) PCT Filed: Mar. 18, 2009

(86) PCT No.: PCT/EP2009/053171
§ 371 (c)(1),
(2), (4) Date: Sep. 8, 2010

(87) PCT Pub. No.: WO2009/115540
PCT Pub. Date: Sep. 24, 2009

(65) Prior Publication Data
US 2011/0014480 A1 Jan. 20, 2011

(30) Foreign Application Priority Data

Mar. 20, 2008 (EP) .................................... 08153054

(51) Int. Cl.
*B32B 27/40* (2006.01)
*B29D 13/00* (2006.01)
*C08G 18/20* (2006.01)

(52) U.S. Cl.
USPC .................. 428/423.1; 264/271.1; 528/54

(58) Field of Classification Search
USPC .................. 428/423.1; 264/271.1; 528/54
See application file for complete search history.

(56) References Cited

U.S. PATENT DOCUMENTS

| 4,764,537 A | 8/1988 | Horn et al. | |
| 5,686,500 A * | 11/1997 | Fishback et al. | 521/129 |
| 5,798,533 A | 8/1998 | Fishback et al. | |
| 7,972,676 B2 * | 7/2011 | Kleba et al. | 428/116 |
| 2002/0081439 A1 | 6/2002 | Forster et al. | |
| 2003/0144372 A1 | 7/2003 | Kometani et al. | |
| 2010/0136285 A1 * | 6/2010 | Poeltl et al. | 428/116 |

FOREIGN PATENT DOCUMENTS

| DE | 36 07 447 | 9/1987 |
| DE | 37 03 398 | 8/1988 |
| EP | 0 153 639 | 9/1985 |
| EP | 0 250 351 | 12/1987 |
| EP | 1 215 223 | 6/2002 |
| WO | WO 2006099939 A1 * | 9/2006 |

OTHER PUBLICATIONS

International Search Report issued Sep. 9, 2009 in PCT/EP09/053171 filed Mar. 18, 2009.

* cited by examiner

*Primary Examiner* — Thao T. Tran
(74) *Attorney, Agent, or Firm* — Oblon, Spivak, McClelland, Maier & Neustadt, L.L.P.

(57) ABSTRACT

The present invention relates to the use of a polyurethane system, comprising (a) polyisocyanates, (b) at least one isocyanate-reactive compound, (c) at least one carboxylic salt of an amine catalyst, where, based on one equivalent of the amine of the amino catalyst, from 0.5 to 1.5 equivalents of acid groups of a carboxylic acid are comprised, (d) if appropriate, further catalysts, (e) if appropriate, a reactive chain extender having at least two groups reactive toward isocyanates, where at least one group reactive toward isocyanates is a free, primary, $NH_2$ group, and (f) if appropriate, further additives, for the production of polyurethane sandwich components. The present invention further relates to a process for the production of polyurethane sandwich components, and also to the polyurethane sandwich components obtained by the process of the invention.

28 Claims, No Drawings

POLYURETHANE SYSTEMS FOR PRODUCING POLYURETHANE SANDWICH PARTS AT LOW MOLDING TEMPERATURES

The present invention relates to the use of a polyurethane system, comprising (a) polyisocyanates, (b) at least one isocyanate-reactive compound, (c) at least one carboxylic salt of an amine catalyst, where, based on one equivalent of the amine of the amino catalyst, from 0.5 to 1.5 equivalents of acid groups of a carboxylic acid are comprised, (d) if appropriate, further catalysts, (e) if appropriate, a reactive chain extender having at least two groups reactive toward isocyanates, where at least one group reactive toward isocyanates is a free, primary, $NH_2$ group, and (f) if appropriate, further additives, for the production of polyurethane sandwich components. The present invention further relates to a process for the production of polyurethane sandwich components, and also to the polyurethane sandwich components obtained by the process of the invention.

Further embodiments of the present invention are found in the claims, in the description, and in the examples. The abovementioned features of the subject matter of the invention, and the features that will be explained below, can, of course, be used not only in the respective combination stated but also in other combinations, without exceeding the scope of the invention.

Polyurethane sandwich components have been known for a long time. These are produced by covering a core layer with a reinforced layer. A polyurethane reaction mixture is applied to one side of this "semifinished sandwich product", and often on both sides, preferably via spray-application. The component covered with the polyurethane reaction mixture, the unfinished sandwich component, is then placed into a mold, in which the semifinished sandwich product is given a particular shape by compression in a thermal compression process and the polyurethane reaction mixture is hardened to give the polyurethane. The reinforcement layer is compacted during this compression process. The extent of this compaction can be varied widely, from a few tenths of a millimeter to a few percent of initial thickness in some subregions. The resultant polyurethane sandwich component is then removed from the mold. The external profile here is shaped by squeezing of the sandwich package within the shaping mold.

So that three-dimensional shaping can be achieved, hardening of the polyurethane reaction mixture must be delayed until the material has reached the mold. In particular in the region of the edges of these compressed regions, the core layer can be sealed by polyurethane only if sufficient flowable polyurethane reaction mixture is present, after the compression process, to cover said regions. These processes are described by way of example in the brochure "PUR—Faserverbundwerkstoffe für den Leichtbau im Fahrzeuginnenraum" ["PU—Fiber composite materials for lightweight construction in vehicle interiors"] from Bayer AG Leverkusen (order number: PU 52248) or "Baypreg F—PUR plus Natur im Automobil, Verbundwerkstoffe aus Polyurethan" ["Baypreg F—PU plus natural materials in automobiles: polyurethane composite materials"] from Bayer AG Leverkusen.

A problem with the known process is that the shaping process has to be carried out at mold temperatures of from about 120 to 140° C., in order to ensure the necessary short demolding times for industrial purposes, without shortening the polyurethane system processing time needed for the production of the unfinished sandwich component, the "open time", and without impairing the necessary flowability of the polyurethane reaction mixture in the mold. However, these high mold temperatures lead to energy consumption in the production of the polyurethane sandwich component; another factor is that direct lamination is possible only using very expensive, heat-resistant decorative materials.

It was an object of the present invention to reduce energy consumption and improve direct lamination behavior in the production of polyurethane sandwich components, without shortening the open time or lengthening the demolding times, in comparison with known processes.

The object of the invention is achieved via the use of a polyurethane system, comprising (a) polyisocyanates, (b) at least one isocyanate-reactive compound, (c) at least one carboxylic salt of an amine catalyst, (d) if appropriate, further catalysts, (e) if appropriate, a reactive chain extender having at least two groups reactive toward isocyanates, where at least one group reactive toward isocyanates is a free, primary $NH_2$ group, and (f) if appropriate, further additives, for the production of polyurethane sandwich components, where, based on one equivalent of amine of the amine catalyst, from 0.5 to 1.5 equivalents of acid groups of a carboxylic acid are comprised.

For the purposes of the invention, a polyurethane system is a system composed of at least two components, where the polyurethane reaction mixture of the invention is obtained on mixing of the components. Components (b) to (f) here are often combined to give what is known as a polyol component, component (a) being termed isocyanate component.

Polyisocyanates used preferably comprise aromatic isocyanates. It is preferable to use aromatic isocyanates of the general formula $R(NCO)_z$, where R is a polyvalent organic radical which comprises an aromatic system, and z is a whole number which is at least 2. Examples here are 4,4'-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, toluene 2,4-diisocyanate, toluene 2,6-diisocyanate, mixtures composed of toluene 2,4- and 2,6-diisocyanate, naphthalene 1,5-diisocyanate, 1-methoxyphenylene 2,4-diisocyanate, diphenylmethane 4,4'-diisocyanate, diphenylmethane 2,4'-diisocyanate, biphenylene 4,4'-diisocyanate, 3,3'-dimethyldiphenylmethane 4,4'-diisocyanate; triisocyanates, such triphenylmethane 4,4',4"-triisocyanate and toluene 2,4,6-triisocyanate, and tetraisocyanates, such as 4,4'-dimethyldiphenylmethane 2,2',5,5'-tetraisocyanate. Particular preference is given to toluene diisocyanates, diphenylmethane 2,4'-diisocyanate, diphenylmethane 4,4'-diisocyanate, polymethylene polyphenylene polyisocyanate, and also to derivatives and mixtures thereof.

It is preferable to use isocyanates having a relatively high number of aromatic nuclei, particular preference being given to polymethylene polyphenylene polyisocyanate, also termed polymer MDI. These can also be prepolymerized prior to use, using polyetherols or polyesterols, to give isocyanate prepolymers, in order to establish specific properties. It is also possible to use crude MDI.

A modified, polyvalent isocyanate in particular used comprises reaction products of polymer MDI and of polyesterols, as described under (b). The functionalities of the isocyanate component here are from 1.2 to 3.0, preferably from 1.5 to 3.0, particularly preferably from 2.0 to 2.8.

The isocyanate-reactive compound (b) used can comprise any compound that can be used in polyurethane production and that has at least two hydrogen atoms reactive toward isocyanates. The isocyanate-reactive compound (b) used preferably comprises a polyether polyol, a polyester polyol, an amine-functionalized compound, or a mixture thereof. Polyether polyols are particularly preferred.

Suitable polyether polyols can be prepared by known processes, for example via anionic polymerization using alkali metal hydroxides, such as sodium hydroxide or potassium hydroxide, or using alkali metal alcoholates, such as sodium methoxide, sodium ethoxide or potassium ethoxide, or potassium propoxide as catalysts, with addition of at least one starter molecule which comprises from 2 to 8 reactive hydrogen atoms, or via cationic polymerization using Lewis acids, such as antimony pentachloride, boron fluoride etherate, etc., or bleaching earth as catalysts, from one or more alkylene oxides having from 2 to 4 carbon atoms in the alkylene radical. The catalysts used can also comprise multimetal cyanide compounds, known as DMC catalysts.

Examples of suitable alkylene oxides are tetrahydrofuran, propylene 1,3-oxide, butylene 1,2-oxide or butylene 2,3-oxide, styrene oxide, and preferably ethylene oxide and propylene 1,2-oxide. The alkylene oxides can be used individually, in alternating succession, or as a mixture.

Examples of starter molecules that can be used are: water, organic dicarboxylic acids, such as succinic acid, adipic acid, phthalic acid, and terephthalic acid, aliphatic and aromatic, optionally N-mono-, N,N-, and N,N'-dialkyl-substituted diamines having from 1 to 4 carbon atoms in the alkyl radical, e.g. optionally mono- and dialkyl-substituted ethylenediamine, diethylenetriamine, triethylenetetramine, 1,3-propylenediamine, 1,3- or 1,4-butylenediamine, 1,2-, 1,3-, 1,4-, 1,5-, and 1,6-hexamethylenediamine, phenylenediamines, 2,3-, 2,4-, and 2,6-tolylenediamine, and 4,4'-, 2,4'-, and 2,2'-diaminodiphenylmethane.

Other starter molecules that can be used are: alkanolamines, such as ethanolamine, diethanolamine, N-methyl- and N-ethylethanolamine, N-methyl- and N-ethyldiethanolamine, and triethanolamine, and ammonia. Preference is given to use of polyhydric, in particular di- to octahydric, alcohols, e.g. ethanediol, 1,2- and 1,3-propanediol, diethylene glycol, dipropylene glycol, 1,4-butanediol, 1,6-hexanediol, glycerol, trimethylolpropane, pentaerytritol, glucose, fructose and sucrose.

The polyether polyols, preferably polyoxyethylene polyols, polyoxypropylene polyols and polyoxypropylene polyoxyethylene polyols, have an average functionality of from 1.5 to 5.0, preferably from 1.8 to 4.2, and in particular from 2.0 to 3.5, and have number-average molecular weights which are preferably from 32 to 1500, particularly preferably from 60 to 1000, and in particular from 60 to 800. The different functionalities here are preferably obtained via the use of different starters.

Other suitable polyols are polymer-modified polyols, preferably polymer-modified polyesterols or polyetherols, particularly preferably graft polyetherols. These are what is known as a polymer polyol, which usually has from 5 to 50% by weight, preferably from 10 to 45% by weight, particularly preferably from 15 to 25% by weight and in particular from 18 to 22% by weight, content of polymers which are preferably thermoplastic. These polymer polyesterols are described by way of example in EP-A-250 351 and are usually prepared via free-radical polymerization of suitable olefinic monomers, such as styrene, acrylonitrile, acrylates, and/or acrylamide, are generally via transfer of the free radicals of growing polymer chains onto polyesterols or polyetherols. The polymer polyol mainly comprises, alongside the graft copolymer, the homopolymers of the olefins, dispersed in unaltered polyesterol.

One preferred embodiment uses acrylonitrile and styrene as monomers, and in particular uses exclusively styrene. The monomers are polymerized, if appropriate, in the presence of further monomers, of a macromer, and of a moderator, and using a free-radical initiator, mostly azo compounds or peroxide compounds, in a polyesterol as continuous phase.

During the free-radical polymerization reaction, the macromers are concomitantly incorporated into the copolymer chain. The result is formation of block copolymers having a polyester block and a polyacrylonitrile-styrene block, these acting as compatibilizer in the boundary between continuous phase and disperse phase and suppressing agglomeration of the polymer polyesterol particles. The proportion of the macromers is usually from 1 to 15% by weight, based on the total weight of the monomers used for preparation of the polymer polyol.

The proportion of polymer polyol is preferably greater than 5% by weight, based on the total weight of component (b). The material can, by way of example, comprise an amount of from 30 to 90% by weight, preferably from 55 to 80% by weight, of the polymer polyols, based on the total weight of component (b). It is particularly preferable that the polymer polyol is polymer polyesterol or is polyetherol.

The carboxylic salt used of an amine catalyst (c) can comprise carboxylic salts of any of the conventional basic amine catalysts used for polyurethane production. The carboxylic salts of the basic amine catalysts are obtained here by mixing the amine catalysts with carboxylic acids. This can take place in a separate step, if appropriate using a solvent, or via addition of the acid and of the basic amine catalyst to the polyol component.

The carboxylic salt of the amine catalyst is preferably obtained by mixing carboxylic acid and basic amine catalyst in a separate step, if appropriate with heating. It is preferable here to use an alcohol as solvent, particularly preferably a di- or trihydric alcohol whose molar mass is smaller than 120 g/mol, in particular ethylene glycol. The resultant carboxylic salt of an amine catalyst can then, in a further step, be combined with at least the component (b), and also, if appropriate, with one of components (d), (e), and (f), to give the polyol component.

Basic amine catalysts are described by way of example in "Kunststoffhandbuch [Plastics handbook], volume 7, Polyurethane [Polyurethanes], Carl Hanser Verlag, $3^{rd}$ edition 1993, chapter 3.4.1. Examples of these are amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, N,N-bis(3-dimethylaminopropyl)-N-isopropanolamine, dimethylpiperazine, 1,2-dimethylimidazole, 1-azabicyclo[3.3.0]-octane and preferably 1,4-diazabicyclo[2.2.2]octane and alkanolamine compounds, such as triethanolamine, triisopropanolamine, N-methyl- and N-ethyldiethanolamine N,N-bis(3-dimethylaminopropyl)-N-isopropanolamine, and dimethylethanolamine. Basic amine catalysts which have at least one, preferably precisely one, group reactive toward isocyanates are in particular used here, an example being N,N-bis(3-dimethylaminopropyl)-N-isopropanolamine. The catalysts can be used individually or in the form of mixtures.

Carboxylic acids used are preferably those whose molar mass is smaller than 300 g/mol. It is particularly preferable here to use saturated and unsaturated aliphatic monocarboxylic acids having from 1 to 18 carbon atoms, e.g. formic acid, acetic acid, cyanoacetic acid, or 2-ethylhexanoic acid, aromatic carboxylic acids, aliphatic, saturated and unsaturated dicarboxylic acids having from 2 to 16 carbon atoms, or tricarboxylic acids, or a mixture thereof. Derivatives of the abovementioned carboxylic acids can also be used. Other preferred carboxylic acids used are dicarboxylic acids of the general formula HOOC—$(CH_2)_n$—COOH, where n is a whole number from 2 to 14. Dicarboxylic acids of this type are generally less corrosive. In particular, the carboxylic acid used comprises adipic acid.

The ratio of acid and amine catalyst here is selected in such a way that the number of equivalents of acid groups of a carboxylic acid comprised is from 0.5 to 1.5, preferably from 0.7 to 1.3, particularly preferably from 0.90 to 1.10, and in particular from 0.95 to 1.05 equivalents, based on one equivalent of amine of the amine catalyst.

An example of a concentration that can be used of the carboxylic salts of an amine catalyst (c) is from 0.001 to 10% by weight, preferably from 0.05 to 5% by weight, and particularly preferably from 0.05 to 2% by weight, based on the weight of components (b) to (f).

Further catalysts (d) that can be used are organic metal compounds, preferably organic tin compounds, such as stannous salts of organic carboxylic acids, e.g. stannous acetate, stannous octoate, stannous ethylhexoate, and stannous laurate, and the dialkyltin(IV) salts or organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate and bismuth octanoate, or a mixture. It is preferable to use no further catalysts (d).

Substances that can be used as reactive chain extenders (e) have two groups reactive toward isocyanates, and these substances have at least one free primary $NH_2$ group. These substances accelerate the polyurethane reaction. The further group reactive toward isocyanate can for example have been selected from a primary amino group, an alcohol group, or a thiol group. The reactive chain extenders (e) used can by way of example comprise aliphatic or aromatic amines. The reactive chain extenders (e) here can be used individually or in the form of mixtures.

In one particularly preferred embodiment, the reactive chain extenders (e) preferably comprise aromatic diamines, in particular tolylenediamines, or derivatives thereof, e.g. 3,5-diethyltolylene-2,4-diamine.

In another preferred embodiment, the reactive chain extender (e) is aliphatic and has, between the two groups reactive toward isocyanates, at least two alkylene groups, each having one or two carbon atoms, where the alkylene groups are respectively separated by a heteroatom. The two groups reactive toward isocyanates are in particular amino groups. The molar mass of the reactive chain extender (e) in this preferred embodiment is preferably from 100 to 400 g/mol, particularly preferably from 100 to 200 g/mol, and in particular from 100 to 150 g/mol. If aliphatic reactive chain extenders are used, triethylene glycol diamine is in particular used as reactive chain extender (e).

The proportion of the reactive chain extenders in the polyol component is preferably from 0.1 to 10% by weight, particularly preferably from 0.3 to 8%, more preferably from 0.5 to 5% by weight, and in particular from 1.5 to 4.0% by weight, based on the total weight of components (b) to (f).

Alongside the reactive chain extenders (e) it is also possible, if appropriate, to use reactive crosslinking agents which have at least one free primary $NH_2$ group, and which accelerate the polyurethane reaction, and whose functionality is greater than 2.

Alongside the reactive chain extenders (e) of the invention, it is possible to use further conventional chain extenders. Examples of these are diols, particularly preferably monoethylene glycol and butanediol. For the purposes of the invention, it is particularly preferable to use mixtures composed of a reactive chain extender of the invention and of a chain extender composed of a diol.

Further additives (f) that can be used are blowing agents, additives having thixotropic effect, fillers, antioxidants, dyes, pigments, optical brighteners, and stabilizers with respect to heat, light, and/or UV radiation, and plasticizers or surfactants.

Examples that may be mentioned of suitable release agents are: reaction products of fatty acid esters with polyisocyanates, salts composed of polysiloxanes comprising amino groups and of fatty acids, salts composed of saturated or unsaturated (cyclo)aliphatic carboxylic acids having at least 8 carbon atoms and of tertiary amines, and also in particular internal lubricants, such as carboxylic esters and/or carboxamides, prepared via esterification or amidation of a mixture composed of montanic acid and of at least one aliphatic carboxylic acid having at least 10 carbon atoms, using at least difunctional alkanolamines, polyols and/or polyamines whose molar masses are from 60 to 400 g/mol, as disclosed by way of example in EP 153 639, or using mixtures composed of organic amines, metal salts of stearic acid, and organic mono- and/or dicarboxylic acids or their anhydrides, as disclosed by way of example in DE-A-3 607 447, or using mixtures composed of an imino compound, of the metal salt of a carboxylic acid, and, if appropriate, of a carboxylic acid, as described by way of example in U.S. Pat. No. 4,764,537.

Blowing agents used can be any of the blowing agents known for the production of polyurethanes. These can comprise chemical and/or physical blowing agents. These blowing agents are described by way of example in "Kunststoffhandbuch [Plastics handbook], volume 7, Polyurethane [Polyurethanes], Carl Hanser Verlag, $3^{rd}$ edition 1993, chapter 3.4.5. Chemical blowing agents are compounds which form gaseous products via reaction with isocyanate. Examples of these blowing agents are water or carboxylic acids. Physical blowing agents here are compounds which are in dissolved or emulsified form in the starting materials for polyurethane production and vaporize under the conditions of polyurethane formation. These are by way of example hydrocarbons, halogenated hydrocarbons, and other compounds such as perfluorinated alkanes, e.g. perfluorohexane, fluorochlorocarbons, and ethers, esters, ketones, and/or acetals.

The polyurethane systems of the invention are preferably water-blown. The proportion of water in water-blown polyurethane systems is from 0.1 to 2.0% by weight, particularly preferably from 0.2 to 1.5% by weight, in particular from 0.4 to 1.1% by weight, based on the total weight of components (b) to (f).

Examples of antioxidants, and stabilizers with respect to heat, light and/or UV radiation are stabilizers from the group of the sterically hindered phenols, e.g. Cyanox 1790® from Cytec Industries INC, HALS stabilizers (hindered amine light stabilizer), triazines, benzophenones, and benzotriazoles. Examples of pigments and matting agents are titanium dioxide, magnesium stearate, silicone oil, zinc oxide, and barium sulfate. Examples of dyes are acidic dyes and dispersion dyes.

The present invention further provides a process for the production of polyurethane sandwich components by taking (i) a core layer and at least one reinforcement fiber layer, (ii) applying a polyurethane reaction mixture to the reinforcement fiber layer, (iii) placing the component from (ii) into a mold and hardening the polyurethane reaction mixture in the mold, (iv) removing the molding from the mold and, if appropriate, subjecting it to further operations, where the polyurethane reaction mixture is obtainable via mixing of the components of a polyurethane system of the invention.

A preferred material used here for the core layer is thermoformable polyurethane foams, or else paper honeycombs, metal honeycombs, or plastics honeycombs. A preferred reinforcement fiber layer used can preferably comprise glass fiber mats, glass fiber nonwovens, random glass fiber layers, woven glass fibers, cut or ground glass fibers or cut or ground mineral fibers, natural fiber mats and knitted natural fibers, cut natural fibers and cut fiber mats, and the corresponding nonwovens and knits based on polymer fibers, or on carbon fibers or on aramid fibers, and also mixtures of these. The reinforcement fiber layer here can be applied to one side of the core layer or else to both sides of the core layer.

Polyurethane reaction mixtures, obtainable via mixing of components (a) to (f) of a polyurethane system of the invention, are applied to the resultant semifinished sandwich product. This is preferably achieved via spray-application of the polyurethane reaction mixture. The viscosity of the polyurethane reaction mixture of the invention at 25° C. is preferably from 280 to 3000 mPas, particularly preferably from 350 to 2000 mPas, directly after mixing, and the viscosity rises rapidly about 5-10 seconds after the mixing process.

To produce the polyurethane reaction mixture, the individual components of the polyurethane system of the invention are mixed in such a way that the isocyanate index is from 80 to 200, in particular from 90 to 150. For the purposes of the present invention, the isocyanate index is the stoichiometric ratio of isocyanate groups to isocyanate-reactive groups, multiplied by 100. Isocyanate-reactive groups here are any of the isocyanate-reactive groups comprised in the reaction mixture, but not the isocyanate group itself.

The unfinished sandwich component is then placed into a mold, and the polyurethane reaction mixture is hardened. The mold temperature here is less than 110° C. The mold temperature is preferably from 40 to 110° C., with preference from 50 to 100° C., and particularly preferably from 65 to 90° C.

The unfinished sandwich components are, if appropriate, laminated to an outer layer or to a decorative layer. The outer layer or the decorative layer here can be applied to one side or to both sides of the polyurethane sandwich component. As an alternative, the outer layer or the decorative layer can be applied after the demolding of the polyurethane sandwich component, in a further operation.

Examples of a decorative layer that can be used here are textiles having a barrier to polyurethane saturation, compact or foamed plastics foils, and also polyurethane spray skins or polyurethane RIM skins. Outer layers that can be used are preformed materials also suitable for outdoor applications, e.g. metal foils or metal sheets, and also compact thermoplastic composites composed of PMMA (polymethyl methacrylate), ASA (acrylate-modified styrene-acrylonitrile terpolymer), PC (polycarbonate), PA (polyamide), PBT (polybutylene terephtalate), and/or PPO (polyphenylene oxide) in coated, coatable, or colored form. Other outer layers that can be used are outer layers produced continuously or batchwise and based on polyurethane resins, on melamine-phenol resins, on phenol-formaldehyde resins, on epoxy resins, or on unsaturated polyester resins.

Another great advantage of the inventive process is that by virtue of the reduced mold temperature it is also possible to use relatively heat-sensitive decorative layers for lamination to the unfinished sandwich components, examples being PVC (polyvinyl chloride), TPU (thermoplastic polyurethane), polyesters, and automobile-carpet materials, and there is no need to delay application of these to a subsequent step, using an adhesive.

The polyurethane sandwich components produced by a process of the invention can by way of example be used as structural components or cladding components, in particular in the automobile industry, in the furniture industry, or in the construction industry.

The unfinished sandwich components are, if appropriate, trimmed on lamination by way of what are known as flash faces or pinch edges, and no further downstream operations, such as stamping or milling, are then needed here.

In particular, when reactive chain extenders (e) are used, polyurethane sandwich components of the invention feature not only the advantage of low processing temperature but also improved edges when compared with components which have been produced without use of reactive chain extenders (e) of the invention. Furthermore, there is less penetration of the polyurethane mixture into the core layer when reactive chain extenders (e) are used, the result here therefore being a saving of material and lower weight of the sandwich components.

The use of reactive chain extenders (e) also leads to reduced contamination of plant during production of the polyurethane sandwich components, since there is less tendency for material to drip from the unfinished sandwich components.

The examples are intended to illustrate the present invention.

Polyol 1: polyether polyol whose OH number is 555 mg KOH/g, prepared via addition of PO onto glycerol.
Polyol 2: polyether polyol whose OH number is 935 mg KOH/g, prepared via addition of EO onto trimethylolpropane.
Polyol 3: polyether polyol whose OH number is 400 mg KOH/g, prepared via addition of EO/PO onto sucrose/diethylene glycol mixture.
Stabilizer: Tegostab® B8443, silicone stabilizer, GE Bayer Silicones
Catalyst 1: N,N-bis(3-dimethylaminopropyl)-N-isopropanolamine
Catalyst 2: adipic salt of N,N-bis(3-dimethylaminopropyl)-N-isopropanolamine in ethylene glycol
Catalyst 3: diethyltoluenediamine
Dye: Isopur® SU-12021/9111, ISL-Chemie
Polyisocyanate: Lupranat® M20W, BASF SE Catalyst 2 here was prepared as follows:

900 g of adipic acid were weighed into a 514-necked round-bottomed flask and slurried in 2100 g of ethylene glycol. The entire system was heated to 70° C. with stirring at reflux in an oil bath and then 1000 g of N,N-bis(3-dimethylaminopropyl)-N-isopropanolamine were added slowly with the aid of a dropping funnel. This caused further heating of the mixture, and the adipic acid which had hitherto merely been slurried underwent reaction to dissolve in the ethylene glycol. A reddish viscous liquid formed.

| Mixing specification 1: (of the invention) | | |
|---|---|---|
| Polyol component | | |
| Polyol 1 | 30.20 | parts by weight |
| Polyol 2 | 25.00 | parts by weight |
| Polyol 3 | 34.00 | parts by weight |
| Stabilizer | 0.40 | parts by weight |
| Water | 0.40 | parts by weight |

-continued

| Mixing specification 1: (of the invention) | | |
|---|---|---|
| Catalyst 1 | | parts by weight |
| Catalyst 2 | 4.00 | parts by weight |
| Catalyst 3 | 2.00 | parts by weight |
| Dye | 4.00 | parts by weight |
| Isocyanate component | | |
| Polyisocyanat | 200.00 | parts by weight |

The average OH number of the polyol mixture (polyols 1 to 3) is $600^{mg\ KOH}/g$

| Mixing specification 2: (comparison) | | |
|---|---|---|
| Polyol component | | |
| Polyol 1 | 35.80 | parts by weight |
| Polyol 2 | 25.00 | parts by weight |
| Polyol 3 | 34.00 | parts by weight |
| Stabilizer | 0.40 | parts by weight |
| Water | 0.40 | parts by weight |
| Catalyst 1 | 0.40 | parts by weight |
| Catalyst 2 | | |
| Dye | 4.00 | parts by weight |
| Isocyanate component | | |
| Polyisocyanat | 200.00 | parts by weight |

The average OH number of the polyol mixture (polyols 1 to 3) is $598^{mg\ KOH}/g$

EXAMPLE 1

Of the Invention

The polyol component and the isocyanate component according to mixing specification 1 were mixed with one another by means of a high-pressure spray system, and spray-applied to a prepared semifinished sandwich product. Specifically, ~225 g/m² of PU reaction mixture was sprayed onto both sides of an expandable honeycomb paperboard of thickness 17 mm, both sides of which had been covered with 225 g/m² of random glass mat. The unfinished sandwich component was then pressed in a mold heated to 85° C. to a component thickness of 15.5 mm and demolded after 60 s. The polyurethane sandwich component obtained after demolding had very good edges, particularly in sharp-edged regions.

COMPARATIVE EXAMPLE 1

Starting from mixing specification 2, the procedure was analogous to that of example 1. Prior to insertion into the mold, a considerable portion of the spray-applied reaction mixture dripped from the unfinished sandwich component. The molding obtained on demolding after 60 s appeared not to be fully hardened.

COMPARATIVE EXAMPLE 2

Starting from mixing specification 2, the procedure was analogous to that of example 1, with pressing for 60 s at a mold temperature of 130° C. Here again, a considerable portion of the spray-applied reaction mixture dripped from the unfinished sandwich component. The component obtained after demolding after 60 s was a fully hardened polyurethane sandwich component with distinct defects at the edges.

The invention claimed is:

1. A polyurethane sandwich component obtained by a process of (i) applying a polyurethane system to at least one reinforcement fiber layer on a core layer, to yield a first component, (ii) placing the first component from (i) into a mold, and giving the first component from (i) a three-dimensional shape by compressing the core layer in the mold, and hardening the polyurethane system, to yield a molding, (iii) removing the molding from the mold, and (iv) optionally, subjecting the molding to further operations, wherein the polyurethane sandwich component comprises the core layer and the polyurethane system, the polyurethane system comprising:
a) at least one polyisocyanate;
b) at least one isocyanate-reactive compound;
c) at least one carboxylic salt of an amine catalyst;
d) optionally, at least one further catalyst;
e) optionally, a reactive chain extender comprising at least two groups reactive toward isocyanates, wherein at least one group reactive toward isocyanates is a free, primary NH₂ group; and
f) optionally, at least one further additive, and, based on one equivalent of amine of the amine catalyst, from 0.5 to 1.5 equivalents of acid groups of a carboxylic acid are comprised.

2. The polyurethane sandwich component according to claim 1, wherein the carboxylic acid is a dicarboxylic acid of a formula HOOC—$(CH_2)_n$—COOH, where n is a whole number from 2 to 14.

3. The polyurethane sandwich component according to claim 2, wherein the amine catalyst c) has at least one isocyanate-reactive group.

4. The polyurethane sandwich component according to claim 2, wherein the reactive chain extender e) is comprised in the polyurethane system at from 0.1 to 10% by weight, based on the total weight of components b) to f).

5. The polyurethane sandwich component according to claim 2, wherein the carboxylic acid is adipic acid.

6. The polyurethane sandwich component according to claim 5, wherein the amine catalyst c) has at least one isocyanate-reactive group.

7. The polyurethane sandwich component according to claim 5, wherein the reactive chain extender e) is comprised in the polyurethane system at from 0.1 to 10% by weight, based on the total weight of components b) to f).

8. The polyurethane sandwich component according to claim 1, wherein the amine catalyst c) has at least one isocyanate-reactive group.

9. The polyurethane sandwich component according to claim 1, wherein the reactive chain extender e) is comprised in the polyurethane system at from 0.1 to 10% by weight, based on the total weight of components b) to f).

10. The polyurethane sandwich component according to claim 1, wherein from 0.7 to 1.3 equivalents of acid groups are present based on one equivalent of the amine of the amine catalyst.

11. The polyurethane sandwich component according to claim 1, wherein from 0.9 to 1.10 equivalents of acid groups of the carboxylic acid are present based on one equivalent of the amine of the amine catalyst.

12. The polyurethane sandwich component according to claim 1, wherein, based on one equivalent of amine of the amine catalyst, from 0.5 to 0.95 equivalents of acid groups of a carboxylic acid are comprised.

13. The process according to claim 12, wherein, based on one equivalent of amine of the amine catalyst, from 0.5 to 0.95 equivalents of acid groups of a carboxylic acid are comprised.

14. The process according to claim 12, wherein, based on one equivalent of amine of the amine catalyst, from 0.5 to 0.9 equivalents of acid groups of a carboxylic acid are comprised.

15. The polyurethane sandwich component according to claim 1, wherein, based on one equivalent of amine of the amine catalyst, from 0.5 to 0.9 equivalents of acid groups of a carboxylic acid are comprised.

16. A process for the production of a polyurethane sandwich component, comprising:
   i) applying a polyurethane reaction mixture to at least one reinforcement fiber layer on a core layer, to yield a first component;
   ii) placing the first component from i) into a mold, and giving the first component from i) a three-dimensional shape by compressing the core layer in the mold, and hardening the polyurethane reaction mixture, to yield a molding;
   iii) removing the molding from the mold; and
   iv) optionally, subjecting the molding to further operations, wherein the polyurethane reaction mixture is obtained via mixing of the components of the polyurethane system comprising:
   a) at least one polyisocyanate;
   b) at least one isocyanate-reactive compound;
   c) at least one carboxylic salt of an amine catalyst;
   d) optionally, at least one further catalyst;
   e) optionally, a reactive chain extender comprising at least two groups reactive toward isocyanates, wherein at least one group reactive toward isocyanates is a free, primary $NH_2$ group; and
   f) optionally, at least one further additive, and wherein, based on one equivalent of amine of the amine catalyst, from 0.5 to 1.5 equivalents of acid groups of a carboxylic acid are comprised.

17. The process according to claim 16, wherein mold temperature is below 110° C.

18. The process according to claim 17, wherein the carboxylic acid is a dicarboxylic acid of a formula HOOC—$(CH_2)_n$—COOH, where n is an integer from 2 to 14.

19. The process according to claim 17, wherein the carboxylic acid is adipic acid.

20. The process according to claim 17, wherein the mold in ii) comprises a decorative element.

21. The process according to claim 16, wherein the mold in ii) comprises a decorative element.

22. The process according to claim 21, wherein the carboxylic acid is a dicarboxylic acid of a formula HOOC—$(CH_2)_n$—COOH, where n is an integer from 2 to 14.

23. The process according to claim 16, wherein the carboxylic acid is a dicarboxylic acid of a formula HOOC—$(CH_2)_n$—COOH, where n is an integer from 2 to 14.

24. The process according to claim 16, wherein the carboxylic acid is adipic acid.

25. The process according to claim 16, wherein the amine catalyst c) has at least one isocyanate-reactive group.

26. The process according to claim 16, wherein the reactive chain extender e) is comprised in the polyurethane system at from 0.1 to 10% by weight, based on the total weight of components b) to f).

27. The process according to claim 16, wherein from 0.7 to 1.3 equivalents of acid groups are present based on one equivalent of the amine of the amine catalyst.

28. The process according to claim 16, wherein from 0.9 to 1.10 equivalents of acid groups of the carboxylic acid are present based on one equivalent of the amine of the amine catalyst.

* * * * *